(12) United States Patent
Canty et al.

(10) Patent No.: US 6,359,742 B1
(45) Date of Patent: Mar. 19, 2002

(54) WELDABLE SIGHTGLASS ASSEMBLY

(75) Inventors: Thomas M. Canty, Williamsville; Paul J. O'Brien, East Aurora; Michael Rizzo, Blasdell, all of NY (US)

(73) Assignee: J. M. Canty, Inc., Lockport, NY (US)

( * ) Notice: Subject to any disclaimer, the term of this patent is extended or adjusted under 35 U.S.C. 154(b) by 0 days.

(21) Appl. No.: 09/843,992

(22) Filed: Apr. 27, 2001

(51) Int. Cl.⁷ .................. G02B 27/00; G02B 5/00; G02B 7/00
(52) U.S. Cl. .............. 359/894; 359/436; 359/440; 220/663; 116/276; 73/325; 73/330; 73/334
(58) Field of Search .................. 359/894, 895, 359/440; 220/663; 116/276; 73/334, 330, 325

(56) References Cited

U.S. PATENT DOCUMENTS 4,162,826 A * 7/1979 Van Der Beck ............ 359/894
4,809,862 A * 3/1989 Canty .......................... 220/663
4,961,628 A * 10/1990 Herberts ..................... 359/894

* cited by examiner

Primary Examiner—Darren Schuberg
Assistant Examiner—Leo Boutsikaris
(74) Attorney, Agent, or Firm—James J. Ralabate

(57) ABSTRACT

The invention provides a sightglass assembly for viewing the interior of a vessel, such as a reaction vessel for chemical or biochemical reactions, and is adapted to be welded to a vessel wall. The sightglass assembly comprises a window disc fused to a metal frame having a flange extending radially therefrom. The assembly is set into an appropriately sized opening in the vessel wall and the outer perimeter of the flange is welded to the vessel wall. An annular groove in the flange, surrounding the frame and window disc, absorbs stresses created by the heat of welding and thus protects the integrity of the entire unit. When installed, the sightglass assembly and inner face of the tank wall provide an easily cleanable smooth continuous surface, free of recesses and crevasses where bacteria can collect and grow or product from previous batches can accumulate and cause contamination.

8 Claims, 1 Drawing Sheet

WELDABLE SIGHTGLASS ASSEMBLY

BACKGROUND OF THE INVENTION

1. Field of the Invention.

This invention relates to sightglass for viewing the interior of a vessel and, more particularly, to a sightglass assembly suitable for welding to the wall of a pressure vessel.

2. Prior Art.

In process reactors, including pressure vessels, used in various industrial processes, for example, in the production of chemicals, pharmaceuticals, and the like, it is known to use viewing means to allow the operators to view the interior of the vessel and the process being carried out. To allow operators to follow the progress of a reaction, to view color changes, and monitor phase changes, and levels of components and the like, such vessels are commonly equipped with viewing windows, attached to the vessel walls. A variety of such viewing windows or sightglasses for such purposes are set forth in the prior art.

U.S. Pat. No. 5,974,877 to Burgess, Jr. discloses a sight window assembly wherein interlocking elements hold a plastic viewing panel to the vessel wall. The plastic material of the viewing panel has a suitable coefficient of expansion so that the panel can be set in an opening in the vessel wall and then expanded by changing temperature conditions to fit tightly within the opening.

U.S. Pat. No. 5,611,241 to Henry et al. discloses a sightglass assembly that may be welded to a pressure vessel, such as a boiler, to provide a chamber in fluid communication with the vessel to permit the viewing of the vessel contents.

U.S. Pat. No. 4,809,862 to Canty discloses a safety viewing window for use in pressure vessels and the like comprising a glass disc fused to a metal frame. Viewing windows of this type and their use in various settings and with various other equipment are disclosed in other patents to canty, including U.S. Pat. Nos. 4,746,178; 4,965,601; 4,977,418; and 5,230,556.

It is known to mount a sightglass on a vessel wall by bolting or clamping to a nozzle or pad, which in turn, is welded to the vessel wall. Typically such an assembly utilizes a gasket between the sightglass and the nozzle or pad to provide a seal from the exterior environment and prevent pressure leaks from the vessel. Mountings of this type utilizing external bolts or clamps, are difficult to clean, and create recesses and crevasses where bacteria may collect and cause contamination. Within the reaction vessel, a sightglass and seal assembly of this type, mounted in this manner, does not provide an inner surface that is flush with the surface of the internal wall of the reactor and thus creates recesses and crevasses within the vessel where process components or portions of the reaction mixture may not mix readily with the total reaction medium. Furthermore, such crevasses and/or recesses provide sites where bacteria and the like may collect and stagnate, avoiding removal during the cleaning process and thus lead to contamination of the vessel. In some industries where cleanliness is extremely important, such as in the food industry, the pharmaceutical industry, the biotech industry and the like, there is a need to eliminate sites where bacteria can grow and contaminate a reaction or product. Such problems might be avoided if it were possible to weld a sightglass directly to a vessel wall so that the inner side of the glass forms a continuous and flush surface with the inner side of the vessel wall. However, since glass and metal cannot be directly welded, such an approach has heretofore been impractical. Sightglass windows such as the Fuseview® windows developed by Canty, as disclosed, for example, in U.S. Pat. No. 4,809,862 comprise a glass disc fused to a surrounding metal frame. However, attempts to weld the metal frame of such sightglasses directly to the wall of a pressure vessel have been unsuccessful due to cracking or shattering of the glass as a result of thermal stresses created during the welding process.

SUMMARY OF THE INVENTION

It is an object of this invention to provide an improved sightglass assembly which avoids the disadvantages noted above with respect to prior art sightglass assemblies.

A further object of this invention is to provide a sightglass assembly for use on enclosed vessels, such as pressure vessels, vacuum tanks and the like to allow the safe viewing of processes and reactions within the vessel.

It is a still further object to provide a sightglass assembly that can be easily and securely installed.

It is a still further object to provide a fused glass to metal sightglass that can be welded to a wall of a process vessel without introducing thermal stresses upon the glass due to the welding process.

It is a still further object to provide a sightglass for mounting in a tank wall that leaves no crevasses or shelves for bacterial or other material buildup due to gaskets, or other sealing devices normally employed in the mounting of windows or sightglasses. This feature is beneficial internally as well as externally as sites for such buildup are eliminated by not employing clamps, bolts, gaskets, flanges, and other such features for mounting of windows or sightglasses.

It is a further object to provide a window for a tank wall that is integral with the wall and therefore as easily cleaned as the other areas of the tank wall surface and can be easily inspected for cleanliness. Here again, this feature is beneficial internally as well as externally since the use of various prior art hardware, such as, clamps, bolts, flanges, etc. for the mounting of the window is eliminated.

The above and other objects are accomplished in accordance with the present invention which comprises a sightglass assembly adapted to be welded to a vessel wall. The sightglass assembly comprises a substantially clear window disc, an annular frame enclosing the window disc and being fused thereto, and a flange extending radially from the frame, the flange having an annular groove surrounding the frame and window disc.

Typically, the flange extending from the frame is substantially thinner than the entire thickness of the viewing portion and preferably extends from the frame at the inner side of the frame, that is, the side of the window and frame that will face the interior of the vessel when mounted. The actual thickness of the flange may vary but will typically be approximately equivalent to the thickness of the vessel wall on which it will be mounted.

In mounting the assembly to the wall of a process vessel, an opening of suitable size and shape is made in the wall and the outer perimeter of the flange is welded thereto, preferably in a butt weld to form an essentially flush surface on the side facing the interior of the vessel. As the perimeter of the flange is welded to the vessel wall, thermal expansion might create stress throughout the assembly. However, the groove will absorb the stresses without transmitting to the glass viewing portion of the assembly and thus protects the integrity of the entire unit.

The stress-absorbing groove is preferably rounded at the bottom of the groove and cut to encircle the frame and window disc. The groove is preferably cut into the flange on the side facing away from the interior of the vessel when mounted. The depth of the groove may vary, but it has been found preferable to cut the groove to a depth of approximately half the thickness of the flange.

The sightglass assembly may vary in size, depending on the size of the vessel in which it is installed and the size of the viewing area desired. Furthermore, it may be adapted for installation on vessels of various shapes, including, for example, flat walled vessels or cylindrical vessels. In the case of cylindrical vessels, the flange of the sightglass assembly may be moderately curved to conform to the radius of the cylindrical vessel in which it is to be installed.

The frame and flange may made from any suitable material including, for example, metals, such as low carbon steel, various stainless steels and the like, and plastics, such as polycarbonates or other. A preferred material, based on strength and corrosion resistance is Hastelloy metal. However, the primary consideration in the choice of materials is that of welding compatibility with the material of the vessel or reactor in which the sightglass assembly is to be installed.

The sightglass or window disc that forms the viewing port of the sightglass assembly may be formed from various suitable materials such as inorganic glasses, including soda lime glass, borosilicate glass, silica, and the like, as well as acrylics and other polymeric materials that are optically clear and/or transparent to the radiation to be detected. For most purposes, the preferred material will be an optically transparent inorganic glass, such as, soda lime glass.

The fusing of the window disc and metal frame, that is, the process of bonding glass and metal together, is described in U.S. Pat. No. 4,809,862 to Canty, and further in *Glass Engineering Handbook*, Third Edition, 1984, Chapter 5, by McLellan and Shand, both disclosures being hereby incorporated by reference in the present disclosure.

DETAILED DESCRIPTION OF THE DRAWINGS

Figure 1:
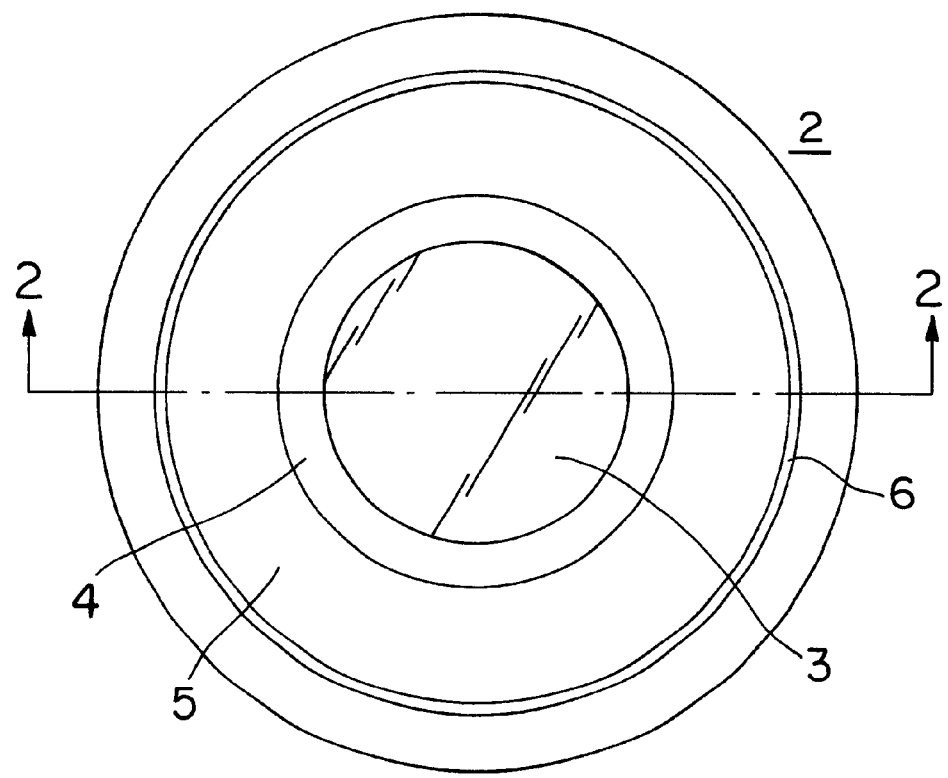
FIG. 1 is a an view of an embodiment of the sightglass assembly of the invention.
Figure 2:
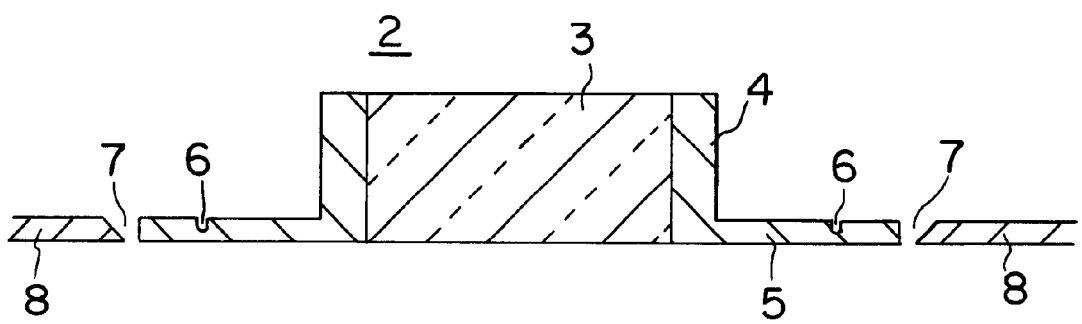
FIG. 2 is a cross-sectional view of the embodiment depicted in FIG. 1, taken along line 2—2 and set within an opening in the wall of a reactor prior to welding thereto.

With reference to the embodiments of FIGS. 1 and 2, a sightglass assembly 2 includes a sightglass 3 fused to a metal frame 4. A flange 5 extends radially outward from the frame 4. A stress relief groove 6 encircles the frame 4 and sightglass 3. In FIG. 2, the sightglass assembly 2 is set within an opening 7 in vessel wall 8 preparatory to welding.

Although the invention has been described with reference to certain preferred embodiments, it will be appreciated by those skilled in the art that modifications and variations may be made without departing from the spirit and scope of the invention as defined in the appended claims.

What is claimed is:

1. A sightglass assembly adapted for welding to a vessel wall, comprising:
   a) a substantially clear window disc;
   b) an annular frame enclosing said window disc and being fused thereto;
   c) a flange extending from said frame,
   d) an annular groove in said flange surrounding said frame and said window disc.

2. A sightglass assembly according to claim 1 wherein said window disc is made of an inorganic glass composition.

3. A sightglass assembly according to claim 2 wherein said frame and flange are made of metal.

4. A sightglass assembly according to claim 3 wherein said frame and flange are made of Hastelloy metal.

5. A sightglass assembly according to claim 3 wherein said annular groove has a depth approximately equal to about one half the thickness of said flange.

6. A sightglass assembly according to claim 3 wherein said flange is thinner than said frame and extends radially from one edge of said frame to form a flush surface coextensive with a surface of said window disc and said frame.

7. A sightglass assembly adapted for welding to a wall of a vessel, said assembly comprising an optically clear window disc of inorganic glass enclosed by and fused to an annular metal frame having a flange extending radially from one edge thereof, said flange having an annular groove therein surrounding said window disc and annular metal frame; said window disc, annular metal frame, and flange forming a continuous flush surface.

8. A viewing window, integral with a wall of a vessel having an inner surface and an outer surface, said window enclosed in and fused to a metal frame, said metal frame having a flange extending radially therefrom and having an outer perimeter welded to said wall; said viewing window, metal frame flange and said inner surface of said wall forming a substantially smooth surface.

* * * * *